United States Patent
Klinger

(10) Patent No.: US 7,077,382 B2
(45) Date of Patent: Jul. 18, 2006

(54) WATER SUPPLY SHUT OFF VALVE WITH QUICK CONNECT HAVING FLOW REGULATION

(75) Inventor: Gary O. Klinger, Rochester Hills, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 26 days.

(21) Appl. No.: 10/889,791

(22) Filed: Jul. 13, 2004

(65) Prior Publication Data

US 2006/0011880 A1    Jan. 19, 2006

(51) Int. Cl.
*F16K 51/00* (2006.01)
*F16L 29/00* (2006.01)

(52) U.S. Cl. ............... 251/149.8; 251/419.9; 137/360; 137/614.18; 137/614.19

(58) Field of Classification Search ............. 251/149.6, 251/149.8, 149.9; 137/360, 613, 614.18, 137/614.19
See application file for complete search history.

(56) References Cited

U.S. PATENT DOCUMENTS

| 3,280,834 | A | | 10/1966 | Zahuranec |
| 4,105,046 | A | | 8/1978 | Sturgis |
| 4,385,025 | A | | 5/1983 | Salerno et al. |
| 4,604,254 | A | | 8/1986 | Yamamoto et al. |
| 4,639,061 | A | * | 1/1987 | Muzslay ............... 439/587 |
| 5,643,521 | A | | 7/1997 | Nehm |
| 5,744,030 | A | * | 4/1998 | Reid et al. ............... 210/235 |
| 5,937,899 | A | * | 8/1999 | Zeiber .................. 137/614 |
| 5,967,491 | A | * | 10/1999 | Magnuson et al. ...... 251/149.6 |
| 6,217,808 | B1 | | 4/2001 | Lacout |
| 6,524,512 | B1 | | 2/2003 | Mintgen et al. |

* cited by examiner

*Primary Examiner*—Edward K. Look
*Assistant Examiner*—John K. Fristoe, Jr.
(74) *Attorney, Agent, or Firm*—Young & Basile, P.C.

(57) ABSTRACT

A water supply shut off valve is mounted in a fluid quick connector carrying a retainer for releasably and latching an endform of an external fluid operative device or conduit to connect the fluid device to a water supply conduit fluidically coupled to the quick connector. The shut off valve is movably mounted in the cartridge between a fluid flow position in response to the full sealing insertion of the endform into the cartridge. In this position, an outlet of in the cartridge is fluidically coupled to a bore in a housing surrounding the cartridge and connected at one end to the water supply conduit. The cartridge is rotatably mounted in the housing such that an outlet in the cartridge is movable with respect to the bore in the housing between maximum fluid flow, intermediate fluid flow, and fluid flow blocking positions.

27 Claims, 6 Drawing Sheets

WATER SUPPLY SHUT OFF VALVE WITH QUICK CONNECT HAVING FLOW REGULATION

BACKGROUND OF THE INVENTION

In the plumbing industry, water conduits have been typically formed of copper pipe. Joints between pipe sections and external connections to flexible conduits, faucets, etc., had been made with solder.

In rough framing a building or home, the pipes are mounted within the wall and/or floor or ceiling and terminate in a "stub out" which is a short length of pipe extending through an opening in a wall. Prior to connecting the stub outs to the building or home fixtures, a pressure test is required. A pressure gauge is attached by solder to one of the stub outs. All of the remaining stub outs are closed by caps which are also soldered on each stub out. The system is then pressurized to detect any leaks.

After the pressure test is completed, the caps and the pressure gauge are removed from the stub outs and the plumbing fixtures attached. Typically, a shut off valve is soldered to many of the stub outs, with an external conduit, which can be formed as a flexible hose, attached to the shut off valve by solder or tightenable compression fittings.

As is evident from the typical building or home plumbing installation, a considerable amount of time is involved in soldering the caps and the pressure gauge to all of the stub outs to perform the code required pressure test and then unsoldering the caps and the pressure gauge prior to soldering shut off valves to the stub outs for connection to the building plumbing fixtures. As a result, the plumbing industry is under increasing pressure to migrate to easy connections for service and hook up of building and home water supply systems. Such easy connections must take into account the code required sealed system pressure test and the typical drywalling around a stub out prior to the connection to the final shut off valve.

Thus, it would be desirable to provide a water supply shut off valve having quick connection features. It would also be desirable to provide a water supply shut off valve having quick connection features which also provide water delivery regulation features. It would also be desirable to provide a water supply shut off valve with quick connection features in which the quick connect connector has an integrated safety shut off if the external plumbing fixture endform or connection is not properly inserted into the quick connector or becomes disconnected from the quick connector.

SUMMARY

The present invention is a fluid supply apparatus connectable to a water supply conduit, typically in a stud wall frame. The apparatus includes a housing having a throughbore extending between first and second ends. The first end of the housing is adapted to be fluidically coupled to the water supply conduit. A cartridge is mounted in the throughbore through the second end of the housing. The cartridge has a bore extending from one end. An outlet is formed in the cartridge and fluidically coupled to the bore in the cartridge. Means are provided for axially holding the cartridge in the housing while allowing rotation of the cartridge relative to the housing. Retainer means are carried on the cartridge for releasably latching an endform to the cartridge.

Seals are provided on the housing and the cartridge to sealingly couple the housing and the cartridge, and the endform to the cartridge. In one aspect, all of the seals are formed as a single, unitary seal including different seal portions between the housing and the cartridge, between the cartridge and the endform, and between the cartridge and the closed position of the shut off valve.

In another aspect, the cartridge is rotatably captured in the housing such that an outlet in the cartridge is movable with respect to a bore in the housing fluidically coupled to the water supply conduit between an open position establishing full fluid flow from the water supply conduit through the housing and the cartridge to the endform coupled to the other end of the cartridge, a closed position blocking all fluid flow between the cartridge and the housing, and a regulatable partial fluid flow position between the full open and the full closed or blocking positions to regulate the amount of fluid flow through the housing and cartridge.

In another aspect, mounting means or guides are carried on the housing for facilitating mounting of the housing to a stud frame. A locator means is carried on the housing, such as from one of the mounting guides, for locating the housing on the stud frame so that the outer end of the housing and/or the cartridge projects a selected distance from an exterior surface of a wall mountable on the stud frame.

In yet another aspect, these are provided for axially capturing the cartridge in the housing wall while allowing rotation of the cartridge within the housing. In this aspect, the capturing means includes a trim nut threadingly engageable with threads formed on one end of the housing. A trim plate may be mounted over the nut to cover the exposed end of the nut and the housing.

The water supply shut off valve with quick connect having flow regulation according to the present invention uniquely provides a quick connection feature to building plumbing and to external conduits, shut off valves, pressure gauges. Seal caps may be easily and replacably mounted on the end of the cartridge and just as easily removed for repair, attachment to building plumbing fixtures, etc. The present quick connect also enables an integrated safety shut off if the external plumbing fixture endform or connection is not properly inserted in the quick connector or becomes disconnected from the quick connector.

BRIEF DESCRIPTION OF THE DRAWING

The various features, advantages and other uses of the present invention will become more apparent by referring to the following detailed description and drawing in which.

DETAILED DESCRIPTION

Figure 1:
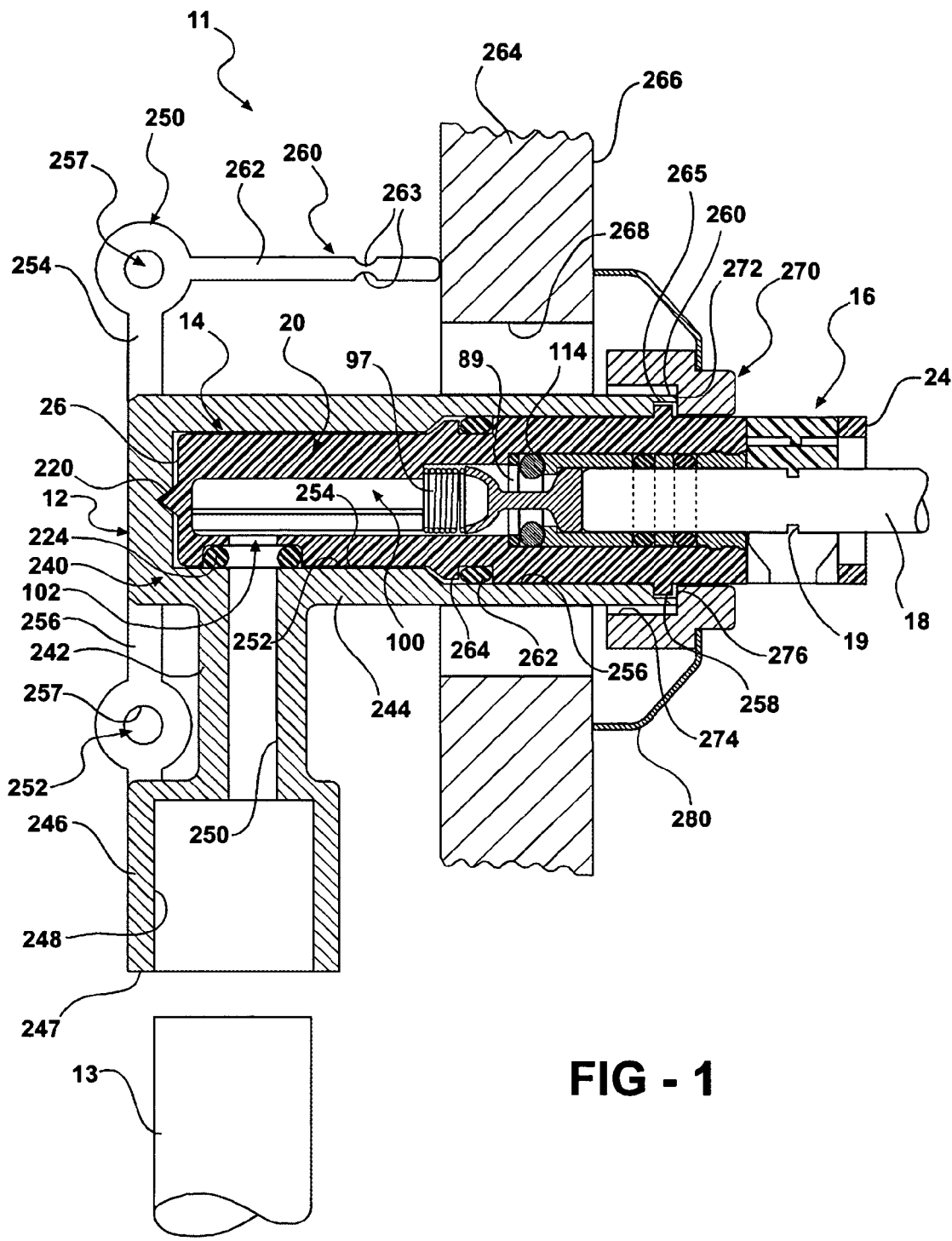
FIG. 1 is a cross sectional view of a water supply shut off valve with quick connection features according to the present invention.

Referring now to FIGS. 1–10 of the drawing, there is depicted a quick connector apparatus 11 with a shut off or stop valve which is connectable to a building or home water supply conduit 13. The quick connector 11 provides a quick connection attachment to an external fluid use or fluid operative device, such as an external pressure gauge, water delivery conduit, etc.

Further, the following description of the use of the fluid quick connector 11 to connect tubular members will be understood to apply to the connection of conduits, hoses, and/or solid metal or plastic tubes to each other in fluid flow communication. The end of a conduit or tubular member inserted into the interior of one end of the quick connector 11 is defined herein as an endform. The endform can be a separate member which receives a separate hose or conduit at one end or a shape integrally formed on the end of an elongated metal or plastic tube. Further, the endform can be integrally formed on or mounted as a separate element to a fluid use device, such as a pump, filter, etc., rather than as part of an elongated conduit.

In general, the quick connector apparatus or means 11 includes a housing 12 which is connectable to a building water supply conduit or tube 13, a cartridge 14 mountable in the housing 12 and carrying a retainer 16 releasably latching an endform 18 of an external fluid delivery or fluid operative device, such as a pressure gauge, external fluid delivery conduit, etc., to the cartridge 14.

The cartridge 14 includes a housing 20 having a first end 24 and an opposed second end 26. As shown by example in FIG. 1, the housing 20 has a generally cylindrical, linear form between the first and second ends 24 and 26.

Figure 4:
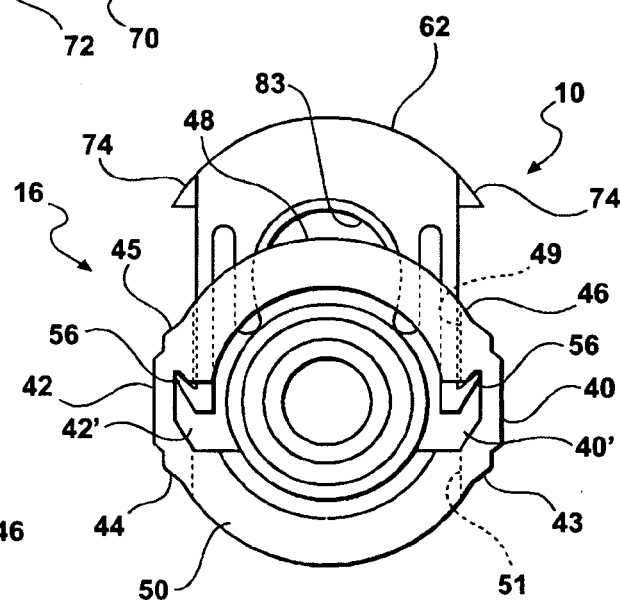
FIG. 4 is an end view of the retainer mounted in a prelatched, shipping position in the quick connector of FIG. 1.
Figure 5:
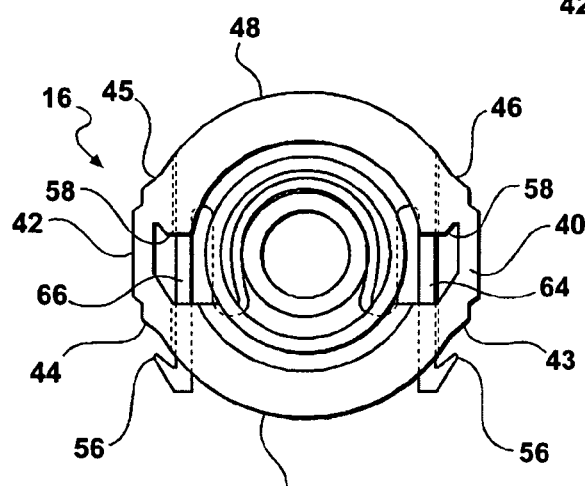
FIG. 5 is an end view of the retainer and the quick connector in a fully latched position.

As shown in detail in FIGS. 4 and 5, the first end 24 of the housing 20 is formed with a pair of opposed, exterior flat surfaces 40 and 42. The flat surfaces 40 and 42 are diametrically opposed on the first end 24 and may be centrally located on each diametrical side of the first end 24. The adjacent surfaces of the housing 20 to one side of the flat surfaces 40 and 42 form an opposed pair of lock surfaces or flats, such as a first flat 43 and a second flat 44. A second pair of flats 45 and 46 are formed on the housing 20 or the other side of the flat surfaces 40 and 42. The flats 43 and 44 extend axially a short distance from the first end 24 of the housing 20. Opposed surfaces 48 and 50 of the first end 24 of the housing 20 between the flats 43 and 44 and the flats 45 and 46 have a generally arcuate shape as shown in FIGS. 4 and 5. Apertures 49 and 51 are formed respectively in each surface 48 and 50. The apertures 49 and 51 are aligned to form a transverse bore extending through the first end 24 of the housing 20 which is disposed in communication with the throughbore in the housing 20.

The retainer 16 is formed of a one-piece body of a suitable plastic, such as polyketone, for example, and has an end wall 62 formed of a generally curved or arcuate shape, by way of example only, and first and second spaced side legs 64 and 66. The side legs 64 and 66 extend generally parallel to each other from opposite ends of the end wall 62. Further, each side leg 64 and 66 has an outer end 72, although it is also possible to connect the side legs 64 and 66 at a lower portion by an arcuate member.

A pair of projections 70 extend along the length of the retainer 16 between opposed side edges of the side legs 64 and 66, respectively. The projections 70 are located adjacent the outer end 72 of each leg 64 and 66. The projections 70 engage surfaces on the housing 20 to position the retainer 16 in the shipping position shown in FIG. 4, or in the fully inserted, latched position shown in FIG. 5. Further, a pair of outward extending lock tabs or edges 74 are formed adjacent the end wall 62 on each side leg 64 and 66.

Figure 3:
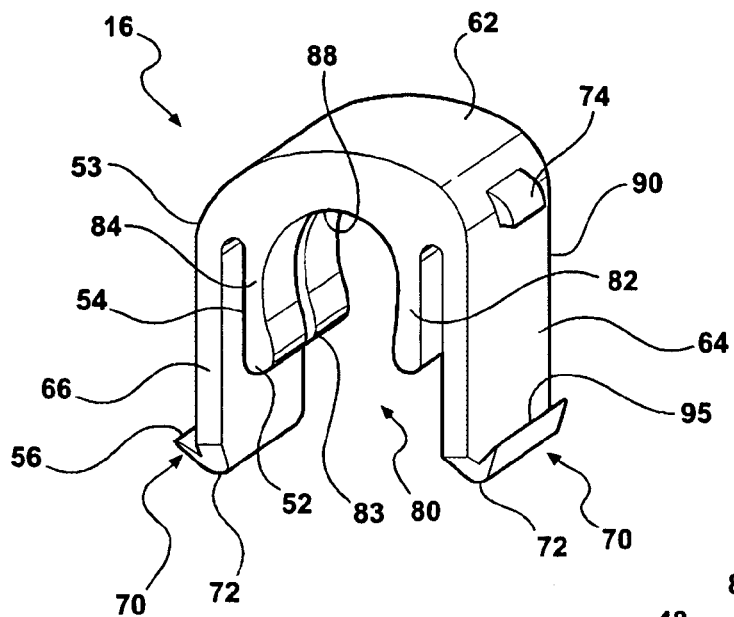
FIG. 3 is a perspective view of one aspect of a retainer deployed in the quick connector shown in FIGS. 1 and 2.

As shown in FIGS. 3–5, the projections 70 on the legs 64 and 66 of the retainer 16 are formed with an angled hook-like shape terminating in a tip 56. The tip 56 is disposed at an acute, upturned angle with respect to the corresponding legs 64 and 66.

Grooves 40' and 42' are formed in the interior of the flat surfaces 40 and 42, respectively, and include a recess or notch 96 at one end which is shaped complimentary to the shape of the tip 56 of the projection 70 on each of the legs 64 and 66 of the retainer 16. In this manner, pull out of the retainer 16 from the housing 20 is resisted by the interlocking tips 56 on the legs 64 and 66 of the retainer 16 which are seated within the notches 58 in the grooves 40' and 42' in the housing 12 as shown in the partially inserted, shipping position of the retainer 16 in FIG. 4. The flats or lock edges 44 and 46 are disposed at an angle complimentary to the acute angle of the tips 56 on the legs 64 and 66 of the retainer 16. This enables interlock of the tips 56 with the flats 44 and 46 resists pull out of the retainer 16 from the housing 20 from the fully latched position shown in FIG. 5.

The hook shaped tips 56 on the legs 64 and 66 of the retainer 16 in conjunction with the grooves 40' and 42' in the housing 20 also provide a distinct, "avalanche effect" snap action of the retainer 16 in the housing 20. The grooves 40' and 42' in the housing 20 are formed in generally planar flat surfaces. The inner surfaces force the ends 72 of the legs 64 and 66 laterally inward toward each other when the retainer 16 is inserted into the housing 20. When the tips 56 clear one edge of the grooves 40' and 42', the resilient nature of the legs 64 and 66 snaps the ends 72 and the tips 56 laterally outward to create an "avalanche effect" which provides a distinct tactile feedback to the user indicating that the retainer has lockingly engaged the housing 20 in either the partially inserted position, shown in FIG. 4, or the fully inserted position shown in FIG. 5.

It should be noted that further insertion force on the retainer 16 moving the retainer 16 from the partially inserted position in FIG. 4 to the fully inserted position shown in FIG. 5 again causes the end 72 of the legs 64 and 66 to be urged laterally inward when the tips 56 of the legs 64 and 66 slide along the lower portion of the inner surfaces. When the tips 56 clear the outer end of the inner surfaces, the legs 64 and 66 spring laterally outward in a distinct "avalanche effect" manner. The lower ends of the grooves 40' and 42' are angled to enable the tips 56 to slide out of the grooves 40' and 42' toward the fully latched position.

The retainer 16 can be first be installed on the housing 20 in a shipping or storage position depicted in FIG. 4. In this position, the projections 70 on the side legs 64 and 66 of the retainer 16 snap into and engage the longitudinally extending grooves 40' and 42'.

Further insertion of the retainer 16 through the aligned apertures 49 and 51 in the housing 20 causes the ends 72 of the legs 64 and 66 to pass along the lower portion of the inner surfaces of the flat surfaces 40 and 42 until the tips 56 clear the ends of the surfaces and then snap outward exteriorly of the outer surface of the first end 24 of the housing 20 as shown in FIG. 5. In this fully inserted position of the endform 14 in the housing 20, an annular locking surface recess 18 on the endform 18 is situated ahead of the arms 82 and 84 of the retainer 10. This position represents the fully latched position in which the endform 14 is fully seated in and lockingly engaged with the connector housing 20. The full insertion of the retainer 16 into the housing 20 also provides visible indication of the fully locked connection of the endform 14 and the housing 20.

In this aspect of the invention, the retainer 16 includes an endform latch member in the form of an arcuate projection 83 extending radially inward between the arms 82 and 84. The projection 83 may have any one of a number of different cross sections, such as a smoothly curved, hemispherical shaped cross section, a squared off, polygonal cross section, etc. Further, the projection 83 may be continuous over a predetermined angular extent of the inner surface of the arms 82 and 84 of the retainer 10 or formed of a plurality of discrete, non-continuous, circumferentially aligned segments.

The arms 82 and 84 have an axial length in the illustrated view, greater than the axial length of the projections 83. Alternately, the arms 82 and 84 and the projection 83 can be combined into a single arcuate projection with the outer surfaces spaced from the outer legs 64 and 66. Further, the projection 83 and the arms 82 and 84 can be integrally combined with the legs 64 and 66.

However, it will be understood that the cross section as well as the radial height of the projection 83 is complementary to the cross section and radial depth of the annular recess 19 in the end form 18. This provides releasable interlocking of the projection 83 in the recess 19 to latch the endform 18 in the housing 20 when the retainer 16 is moved into the fully latched position.

It will also be apparent that if the retainer 16 is in the fully latched position shown in FIGS. 1 and 5, prior to insertion of the endform 18 into the housing 20, the radially inward extent of the projection 83 blocks full insertion of the endform 18 into the housing 20. Likewise, the endform 18 must be fully inserted into the bore in the housing 20, as shown in FIG. 1, for the projection 83 to axially align with and engage the recess 19 in the endform 18 so as to enable the retainer 16 to be moved to the fully latched position shown in FIGS. 1 and 5. If the tip end 17 of the endform 18 is spaced from the fully inserted position in the bore in the housing 20 shown in FIG. 2, the projection 83 on the retainer 16 will not align with the recess 19 in the endform 18 such that the retainer 16 cannot be transversely moved into the fully latched position. When this occurs, the outer edge of the central leg 62 of the retainer 16 will extend outward from the housing 20 to provide an indication of a non-fully inserted endform 14. Further details of the construction and operation of the retainer 16 can be had by referring to U.S. Pat. No. 6,637,779, the contents of which are incorporated herein by reference.

It will be understood that the above-description of a retainer configured for releasable engagement with a recess in an endform to releasably latch the endform to the quick connector housing this is by way of example only. Other retainer and endform latching configurations, such as the tranversely mounted retainer which engages an endform having a raised bead described in U.S. Pat. Nos. 5,542,716, 5,782,502, 5,951,063, and 5,782,502, can also be employed in the quick connector 11 of the present invention.

Figure 10:
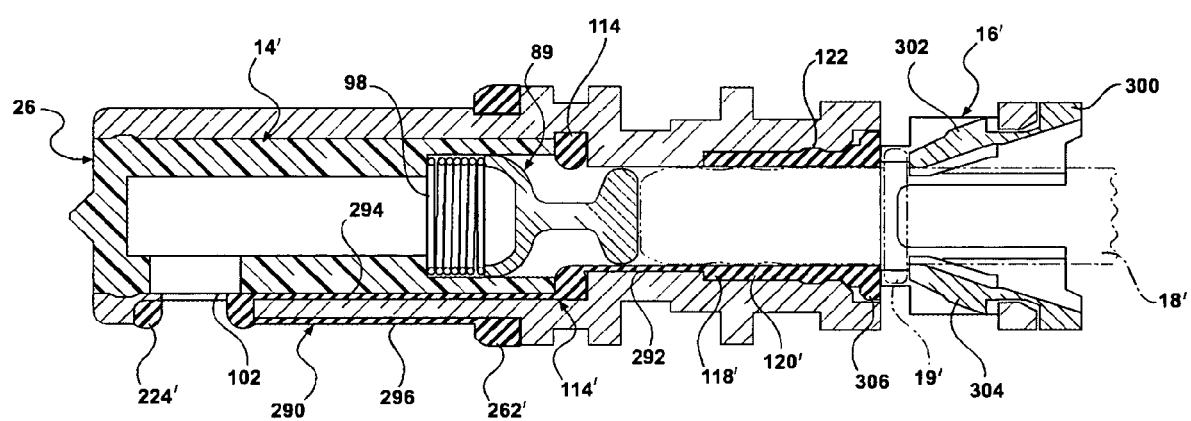
FIG. 10 is a longitudinal, cross sectional view of another aspect of a seal means and a retainer according to the present invention.

In addition, axially mounted retainers and quick connector housing configurations, typically employed with raised SAE flanged or beaded endforms, as shown in U.S. Pat. No. 6,402,204, and as illustrated in FIG. 10 and described hereafter, may also be employed in the quick connector 11 of the present invention.

The housing 20 of the cartridge 14 includes a throughbore denoted generally by reference number 100 which extends from the first end 24 to an outlet 102. The outlet 102 is located adjacent to the second end 26 of the housing 20. The bore 100 has a stepped or multidiameter configuration. By example, the bore 100 includes a first largest diameter bore portion 104 extending from the first end 24 of the housing 20, a contiguous, co-axial second, smaller diameter bore portion 106, and a third, co-axial, yet smaller diameter bore portion 108.

The first diameter bore portion 104 provides an opening for receiving the tip end 17 of the endform 18 and accommodates the raised of enlarged diameter flange or bead 110 formed on the endform 18 and spaced from the tip end 17.

The coaxial, contiguous second bore portion 106 accommodates a first seal or O-ring 114, a cylindrical sleeve 116, a second seal member or members 118 which have a rigid spacer 120 interposed in between, a third end seal 126, such as an O-ring, interposed between the first seal 114 and a shoulder formed between the second and third bore portions 106 and 108, and a top hat 122 having a raised projection which snaps into an annular recess 124 in the second bore portion 106 to latch the top hat 122 in the second bore portion 106 so that the top hat 122 can functions to retain the seal members 118 and 126, the spacer 120, the sleeve 116, and the first seal 114 in the second bore portion 106.

A locating tip 220 is formed on the second end 26 of the housing 20 for centering and rotatably supporting the housing 20 of the cartridge 14 in the surrounding housing 12, as described hereafter.

Figure 2:
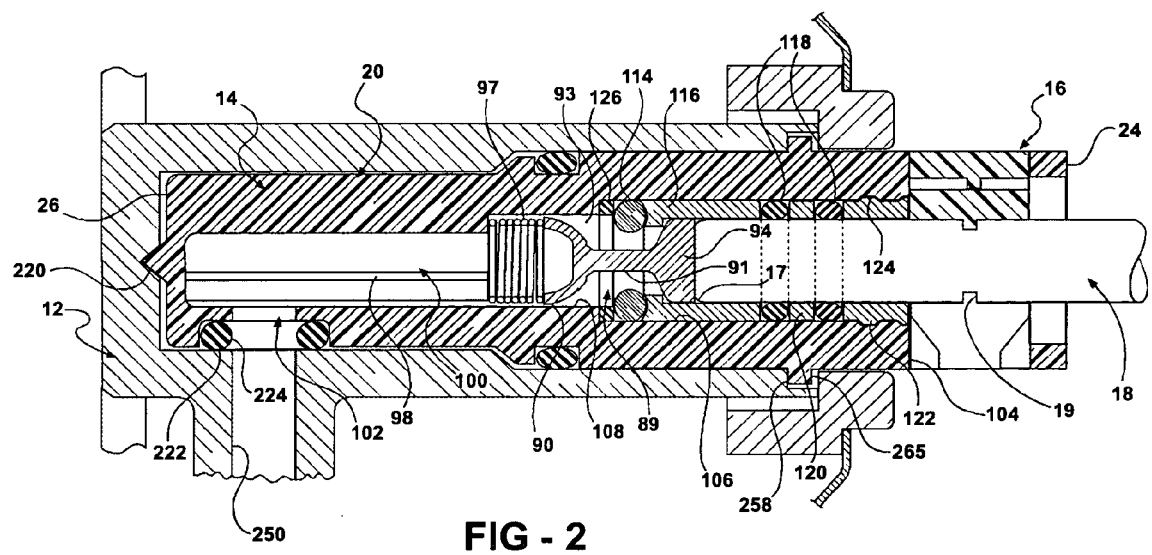
FIG. 2 is a partial, enlarged view of the quick connector shown in FIG. 1, with the shut off valve depicted in an open flow position.

The outlet 102, by example only, is disposed transversely, substantially at a 90 degree angle, from the longitudinal axis of the bore 100 in the housing 20. As shown in FIGS. 1 and 2, the outlet 102 is close adjacent to, but spaced from the second end 26 of the housing 20. The outlet 102 opens to a larger diameter recess 222 which receives a fourth seal, such as an O-ring 224, for sealing the outlet 102 to the adjacent surface of the housing 12.

Figure 6:
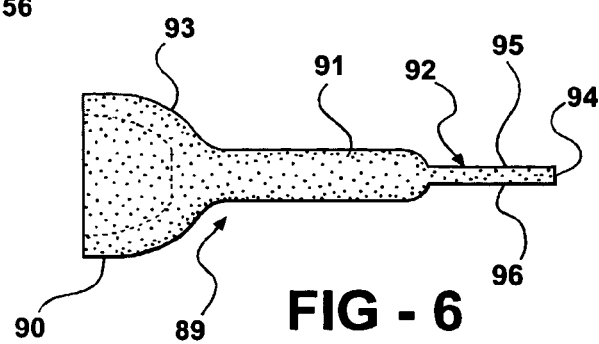
FIG. 6 is a side elevational view of the shut off valve shown in FIG. 1.
Figure 7:
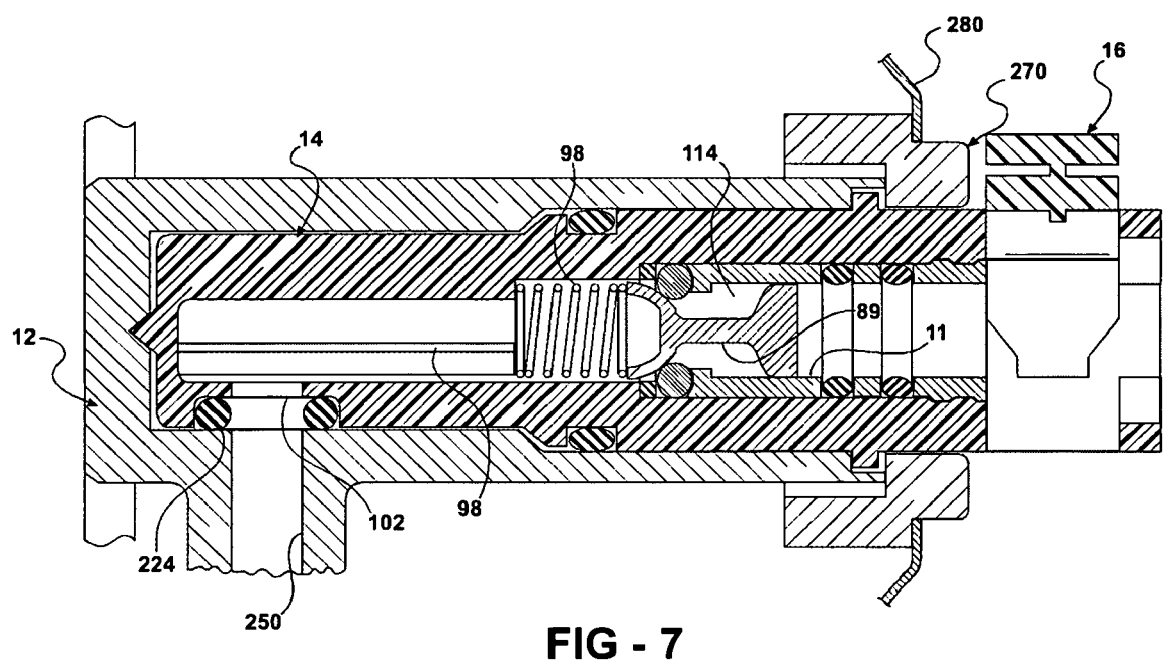
FIG. 7 is a partial, longitudinal, cross sectional view, similar to FIG. 2, but depicting the shut off valve in a flow blocking position.
Figure 8:
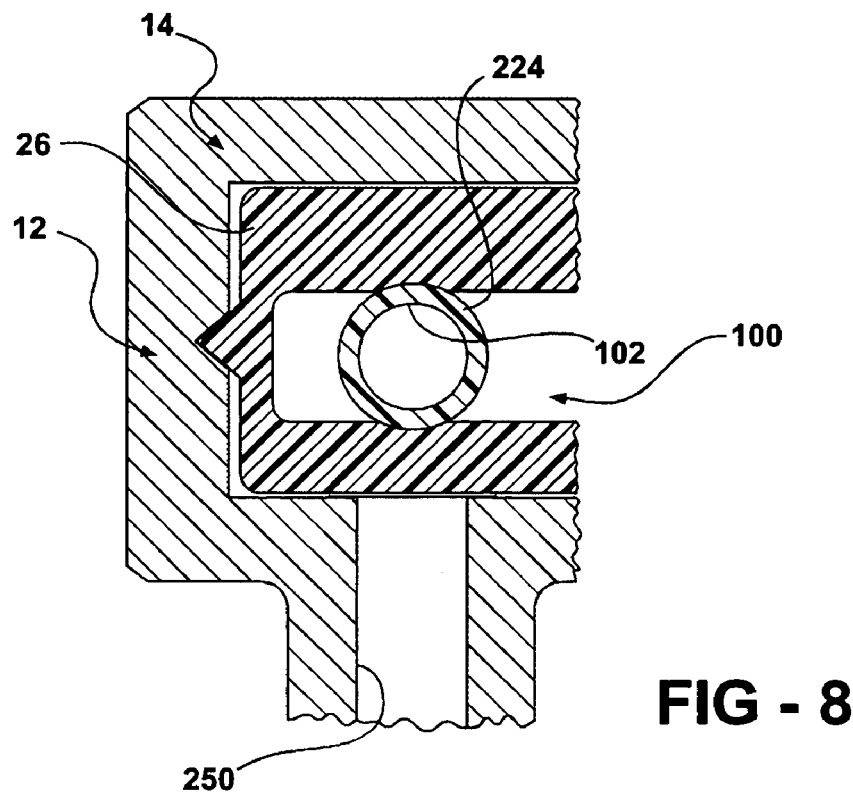
FIGS. 8 and 9 are partial, enlarged, longitudinal, cross sectional views showing different flow regulating positions of the cartridge in the housing of the quick connector shown in FIG. 1.
Figure 9:
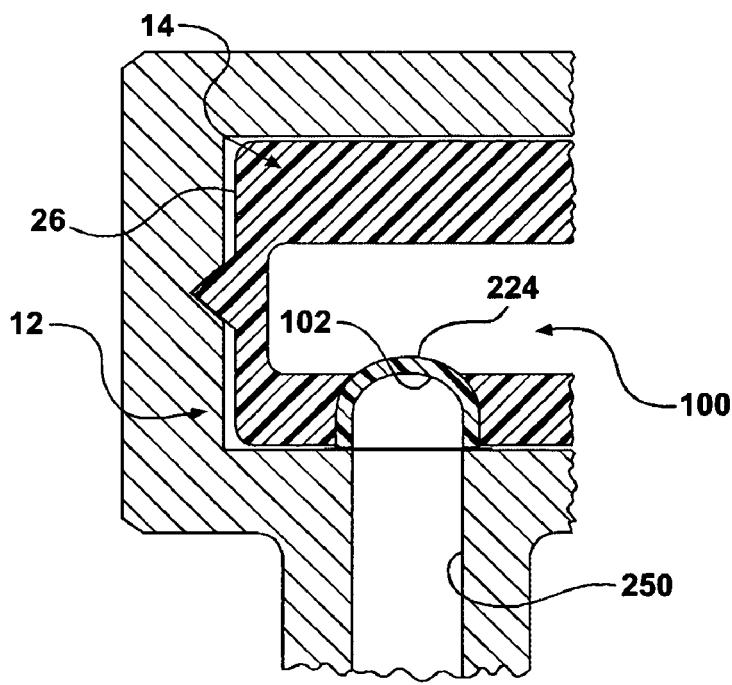

As best viewed in FIGS. 2, 6, and 7, the cartridge 14 includes a check or shut off valve 89 disposed within the bore 100. The valve 89 includes a generally goblet-shaped valve member 90 including a hemispherical seat portion 90, elongated stem portion 91 and a radially extending guide portion 92. The valve 89 is disposed concentrically within the bore 100, seat portion 90 having a concave recess formed therein facing an outlet 102. The seat and the stem portions and the guide portions 90, 91, and 92, respectively, are integrally formed from suitable materials, such as injection molded plastic. The outer circumferential surface of the seat portion 90 defines a curved annular seat 93 which sealingly engages a fixed resilient annular seal 114, such an O-ring, within bore portion 106 to selectively open or check the flow of fluid through bore 100.

A helical spring biases valve 89 from its open (illustrated) position towards its closed position. Guide portion 92 forms a generally fishtail configuration defining a leftwardly facing abutment surface 94 configured to abut a tip end of the endform 18 to displace valve 89 to its open position. Generally parallel laterally opposed surfaces 95 and 91 of the guide portion 92 provide clearance for fluid flow through the open end of the endform 18. The rounded contour of abutment surface 94 provides a degree of swivel or rocking freedom to effect positive engagement between abutment surface 94 and leading edge 17 of the endform 18 to ensure straight, axial displacement thereof.

Thus configured for high strength, light weight and minimal cross sectional area (flow resistance), the valve 89 is displaceable from a first or closed position illustrated in FIG. 7 wherein the seat 90 contacts the seal 114 to entirely close off communication through the bore 100, to a second position illustrated in FIG. 1 wherein the valve 89 is displaced leftwardly to establish open communication through bore 100. The valve 90 is displaced from the first to the second position in response to full insertion of the tip end 17 of the end form 18 within the bore 100 and the interlocking of the retainer 16 with the endform 18 in the usual manner. Once engaged, the tip end 17 of the endform 18 contacts guide portion to displace the valve 89 to its open position.

As best viewed in FIGS. 2 and 7, a plurality of circumferentially spaced, axially elongated, radially inwardly directed guide ribs 98, formed on the inner diameter of bore portion 108 and serve to radially guide seat portion 90 of valve member 89 while permitting relatively free axial displacement thereof.

In application, when the endform 18 and the retainer 16, are fully engaged, as illustrated in FIG. 1, the valve 89 is retained in the open position to provide a free and relatively unrestricted flow of fluid through the bore 100.

As shown in FIGS. 1 and 2, the housing 12 has a unitary structure formed of one or more portions, with a single body portion 240 depicted by way of example. The body 240 may be formed of a suitable material, such as metal or plastic.

Again, by way of example only, the body 240 has a generally elbow or L-shape formed of a first section 242 and an angularly extending second section 244.

The first section 242 has an enlarged diameter end collar 246 with an internal bore or seat 248 sized to receive one end of the water supply tube 13. The water supply tube 13 is sealingly fixed in the seat 248 by means of solder in the case of a copper or metal supply tube 13, or by adhesive in the case of a plastic, such as a PVC water supply tube.

The bore or seat 248 fluidically communicates with a throughbore 250 which opens to a bore 252 in the second body section 244. The second bore 252 is sized to receive the cartridge 14. As shown in FIGS. 1 and 2, one end of the throughbore 250 opens to the discharge outlet 102 in the cartridge 14 as described above.

Although the second bore 250 may have a substantially constant diameter between opposed end, by way of example only, the second bore 250 has a first diameter bore portion 254 sized to receive the second end 26 of the cartridge 14. The first bore portion 254 opens to a larger diameter second more portion 256. The second bore portion 256 extends to a larger diameter annular recess 258 at the second end 260 of the body 240 of the housing 12.

As noted above, the fourth seal 224 disposed in the recess 222 adjacent the second end 26 of the body 20 of the cartridge 14 seals the outlet 102 of the cartridge 14 to one end of the throughbore 250 in the body 240 of the housing 12. Another seal 262 seats in a recess 264 in the body 20 of the cartridge 14 to seal the body 20 to the second bore portion 256 of the housing 12.

The annular recess 258 at the second end 260 of the body 240 receives an annular centering projection 265 formed on the body 20 of the cartridge 14.

In this manner, and in conjunction with the locating tip 220, the cartridge 14 is capable of rotation about its longitudinal axis within the housing 12. The second end portion 24 which carries the retainer 16 may be employed as a grasping surface to facilitate rotation of the cartridge 14, between a first maximum open flow position shown in FIG. 1, a completely closed off, flow fluid blocked position shown in FIG. 8 and any of a number of variably selectable, partial flow positions shown pictorially in FIG. 9. The seals 262 and 224 may provide friction to maintain the cartridge 14 in the selected angular or rotated position within the housing 12. In addition, although not shown in the drawing, a detent in the form of a pin or projection extending outward from the body 20 of the cartridge 14 may engage stops or partial annular grooves in the bore 100 of the housing 12 to define detent or stop positions at the full fluid flow open position shown in FIG. 1, the full fluid flow blocked position shown in FIG. 8, or a selected intermediate flow position shown by example in FIG. 9.

As shown in FIG. 1, the quick connector apparatus 11 also includes mounting means in the form of guides 250 and 252. At least one guide 250 or 252 can be used to mount the apparatus 11 on a wall stud or other support surface in the orientation shown in FIG. 1.

The mounting means 250 and 252 are in the form of thin ribs 254 and 256 which extend along the spaced sections of the body 240 of the housing 12 and/or project outward from one portion of the body 240. Each mounting means 254 and 256 includes an aperture which receives a fastener, such as a nail or screw, to fixedly mount the apparatus 11 on a wall stud.

According to another unique feature of the present invention, locating means 260 is formed on the body 240 of the housing, such as by means of a rib 262 extending from the guide means 250. The rib 262 is provided in a length so as to line up with the edge of a stud on which a wall surface, such as a wall surface formed by a sheet of drywall 264, will be mounted. This enables the second end 24 of the cartridge 14 to be disposed at the proper distance away from the outer surface 266 of the wall surface 264 which is typically added after completion of the plumbing system.

A thinned down section 263 can be formed on the rib 262 to form a break-off point to shorten the length of the rib 262 so as to cause the end 24 of the cartridge 14 to remain at the proper distance from the wall 264 when the wall 264 has an increased thickness for accompodating tile.

As shown in FIG. 1, an aperture 268 is formed in the wall 264 to allow passage of the second end portion 24 of the cartridge, as well as an end portion 260 of the body 240 of the housing 12 therethrough. As also seen in FIG. 1, a cartridge containing nut 270 has a central bore 272 extending between opposed ends. The bore 272 has an end portion sized to allow the second end 24 of the cartridge 14 to pass therethrough. The inner surface of the bore 272 is also spaced from the outer surface of the cartridge 14 to allow rotation of the cartridge 14 as described above.

The other end portion 274 of the bore 272 is formed with a plurality of threads which mate with threads formed on the end 260 of the body 240 of the housing 12. An inner shoulder 276 formed between the two end portions of the bore 272 and 274 captures an enlarged flange 264 on the body 20 on the housing 12 of the cartridge 14 to axially capture and retain the cartridge 14 in the housing 20; while still allowing rotation of the cartridge 14 within the housing 12. Finally, an outer trim plate 280 is mountable over a peripheral portion of the retaining nut 270 for an aesthetic appearance. The trim plate 280 is releasably mountable on the nut 270 by suitable means, such as a snap in groove in the nut 270, for example.

Referring now to FIG. 10, there is depicted several alternate aspects of the present invention. In the cartridge 14' shown in FIG. 10, at least two, and preferably, all of the seals 224, 262, 114, and 120 are integrally formed as a single enlarged seal means by a double shot molding process in, for example, on the cartridge 14, and on surfaces of the cartridge 14'. The seal means recesses 290 includes portions corresponding to the above-described seals in the aspect of the cartridge 14 shown in FIG. 1. Specifically, the seal means 290 includes an outlet seal portion 224', a cartridge to housing seal 262', a shut off valve seal 114', endform seals and spacer 118' and 120'. All of the seal portions 224', 262', 114', 118', and 120' are joined together by interconnecting portions 292, 294, and 296.

Also shown in the aspect of the cartridge 14' shown in FIG. 10, a retainer 16' is illustrated as being in the form of an axially mounted retainer 16', such as that described in U.S. Pat. No. 6,402,204. In general, the retainer 16' includes an annular end ring 300 from which extend a pair of angularly and radially inward projecting flexible arms 302 and 304. The ends of the arms 302 and 304 are spaced from an opposite annular collar 306 which is connected to the end ring 300 by beams, not shown in FIG. 10. The flexible arms 302 and 304 allow passage of the raised flange or bead 19' on the endform 18' and then snap behind the raised bead 19' as shown in FIG. 10 to retain the endform 18' in the cartridge 14.

In summary, there has been disclosed a unique water supply shutoff valve with quick connect having flow regulation features which can be mounted in a building stud frame and connected to a water supply conduit to provide an easy, releasably latchable slide in connection to an external fluid conduit, pressure gauge, etc.

What is claimed is:

1. A fluid supply apparatus connectable to a water supply conduit in a stud frame comprising:
   a housing having a throughbore extending between first and second ends, the first end of the throughbore adapted to be fluidically coupled to the water supply conduit;
   a cartridge rotatably and non-axially movably mounted in the throughbore of the housing, the cartridge having a bore extending from one end;
   an outlet in the cartridge fluidically coupled to the bore in the cartridge, the outlet having a fixed cross section variably fluidically communicatible with the bore extending to the first end of the housing as the cartridge is rotated with respect to the housing; and;
   a retainer, carried on the cartridge, adapted for releasably latching an endform to the cartridge.

2. The fluid supply apparatus of claim 1 further comprising:
   a seal, carried on the housing and the cartridge, for sealingly coupling the housing and the cartridge.

3. The fluid supply apparatus of claim 2 wherein the seal further comprises:
   at least one seal disposed between the housing and the cartridge.

4. The fluid supply apparatus of claim 2 wherein the seal comprises:
   a seal mounted in a recess on the cartridge.

5. The fluid supply apparatus of claim 2 wherein the seal comprises:
   a seal mounted about the outlet of the cartridge.

6. The fluid supply apparatus of claim 2 wherein the seal further comprises:
   at least one seal mounted internally in the cartridge adapted for sealing the endform in the cartridge.

7. The fluid supply apparatus of claim 2 wherein the seal comprises:
   a one-piece, seal member dual-shot with the cartridge.

8. The fluid supply apparatus of claim 1 further comprising:
   a mount carried on the housing adapted for mounting the housing to a stud frame.

9. The fluid supply apparatus of claim 8 wherein the mounting means comprises:
   at least one rib projecting from the housing, an aperture formed in the rib for receiving a fastener.

10. The fluid supply apparatus of claim 1 wherein the retainer comprises:
    a transverse opening formed in the cartridge adjacent the one end; and
    a transversely movable body mountable in the opening, the body including an endform engagement surface adapted for engaging a mating surface on the endform to releasably lock the endform in the cartridge.

11. The fluid supply apparatus of claim 1 further comprising:
    an axial holder axially holding the cartridge in the housing.

12. The fluid supply apparatus of claim 11 further comprising:
    a valve movably positioned within the cartridge between a first position blocking flow through the bore in the cartridge when the endform is not fully inserted into the cartridge and a secured open flow position when the end form is fully inserted into the cartridge.

13. The fluid supply apparatus of claim 1 wherein the axial holder comprises:
    a threaded nut engageable with external threads on the housing, a portion of the nut projecting radially inward over the second end of the bare in the housing to axially capture the cartridge in the housing.

14. The fluid supply apparatus of claim 13 further comprising:
    a trim plate mountable over the nut.

15. The fluid supply apparatus of claim 1 further comprising:
    the cartridge including an end portion projecting exteriorly of the second end of the housing for enabling rotation of the cartridge relative to the housing.

16. The fluid supply apparatus of claim 15 wherein:
    the retainer is mounted in the end portion of the cartridge extending exteriorly of the housing.

17. The fluid supply apparatus of claim 1 further comprising:
    a seal for sealingly coupling at least one of the housing and the cartridge, the outlet of the cartridge and the housing, and the endform to the cartridge.

18. The fluid supply apparatus of claim 17 wherein the seal frictionally holds the cartridge in any rotated position of the cartridge within the housing.

19. A fluid supply apparatus connectable to a water supply conduit in a stud frame comprising:
    a housing having a throughbore extending between first and second ends, the first end of the throughbore adapted to be fluidically coupled to a water supply conduit;
    a cartridge mounted in the throughbore through the second end of the housing, the cartridge having a bore extending from one end;

an outlet in the cartridge fluidically coupled to the bore in the cartridge the outlet fluidically communicatible with the first end of the housing;

an axial holder axially holding the cartridge in the housing;

a retainer, carried on the cartridge, the retainer adapted for releasably latching an endform to the cartridge; and a one-piece, unitary seal means dual shot on the cartridge and fluidically sealing at least one of the housing and the cartridge, an endform and the cartridge, and an outlet of the cartridge to the housing.

20. A fluid supply apparatus connectable to a water supply conduit in a stud frame comprising:

a housing having a throughbore extending between first and second ends, the first end of the throughbore adapted to be fluidically coupled to a water supply conduit;

a cartridge mounted in the throughbore through the second end of the housing, the cartridge having a bore extending from one end;

an outlet in the cartridge fluidically coupled to the bore in the cartridge, the outlet fluidically communicatible with the first end of the housing;

an axial holder axially holding the cartridge in the housing;

a retainer, carried on the cartridge, adapted for releasably latching an endform to the cartridge;

a mount carried on the housing for mounting the housing to a stud frame, the mount including at least one rib projecting from the housing, an aperture formed in the rib for receiving a fastener, and an arm projecting from the rib, the arm having a length such that engagement of an end of the arm with an inner surface of a wall surface mounted on the stud frame spaces one end of the housing a predetermined distance relative to the wall surface.

21. A fluid supply apparatus connectable to a water supply conduit in a stud frame comprising:

a housing having a throughbore extending between first and second ends, the first end of the throughbore adapted to be fluidically coupled to a water supply conduit;

a cartridge mounted in the throughbore through the second end of the housing, the cartridge having a bore extending from one end;

an outlet in the cartridge fluidically coupled to the bore in the cartridge, the outlet fluidically communicatible with the first end of the housing:

an axial holder axial holding the cartridge in the housing;

a retainer, carried on the cartridge, adapted for releasable latching an endform to the cartridge;

a mount, carried on the housing, for mounting the housing to a stud frame; and a locator, carried on the housing, for locating one end of the cartridge a predetermined distance from a wall surface to be mounted on the stud frame.

22. A fluid supply apparatus connectable to a water supply conduit in a stud frame comprising:

a housing having a throughbore extending between first and second ends, the first end of the throughbore adapted to be fluidically coupled to a water supply conduit;

a cartridge mounted in the throughbore though the second end of the housing, the cartridge having a bore extending from one end;

an outlet in the cartridge fluidically coupled to the bore in the cartridge e the outlet fluidically communicatibie with the first end of the housing:

an axial holder for axially holding the cartridge in the housing: and a retainer, carried on the cartridge, for releasably latching an endform to the cartridge, the retainer including a body having a pair of flexible angularly inward extending anus adapted to engage an enlarged bead on the endform, the arms carried on an annular ring axially mountable through one end of the cartridge.

23. A fluid supply apparatus connectable to a water supply conduit in a stud frame comprising:

a housing having a throughbore extending between first and second ends, the first end of the throughbore adapted to be fluidically coupled to a water supply conduit;

a cartridge mounted in the throughbore through the second end of the housing, the cartridge having a bore extending from one end;

an outlet in the cartridge fluidically coupled to the bore in the cartridge, the outlet fluidically communicatible with the first end of the housing;

an axial holder axially holding the cartridge in the housing, the axial holder including a threaded nut engageable with external threads on the housing, a portion of the nut projecting radially inward over the second end of the bore in the housing to axially capture the cartridge in the housing; and a retainer carried on the cartridge, for releasably latching an endform to the cartridges.

24. The fluid supply apparatus of claim 23 further comprising;

a trim plate mountable over the nut.

25. A fluid supply apparatus connectable to a water supply conduit in a stud frame comprising:

a housing having a throughbore extending between first and second ends, the first end of the throughbore adapted to be fluidically coupled to a water supply conduit;

a cartridge mounted in the throughbore through the second end of the housing, the cartridge having a bore extending from one end;

an outlet in the cartridge fluidically coupled to the bore in the cartridge, the outlet fluidically communicatible with the first end of the housing;

an axial holder axially holding the cartridge in the housing and a retainer, carried on the cartridge, for releasably latching an endform to the cartridge, and the cartridge rotatably mounted in the housing to bring the outlet in the cartridge in a maximum fluid flow position with respect to the first end of the throughbore in the housing to a position in which the outlet is closed to the throughbore in the housing to block all fluid flow from the housing to the cartridge, and at least one intermediate position where only a portion of the maximum cross sectional area of the outlet is fluidically coupled to the throughbore in the housing to provide an intermediate amount of fluid flow through the cartridge and a retainer, earned on the cartridge, for releasably latching an endform to the cartridge.

26. A fluid supply apparatus connectable to a water supply conduit in a stud frame comprising:

a housing having a throughbore extending between first and second ends, the first end of the throughbore adapted to be fluidically coupled to a water supply conduit;

a cartridge rotatably mounted in the throughbore of the housing through the second end of the housing, the cartridge having a bore extending from one end;

an outlet in the cartridge fluidically coupled to the bore in the cartridge the outlet fluidically communicatible with the first end of the housing:

an axial holder axial hold the cartridge in the housing the axial holder including threaded nut engageable with external threads on the housing, a portion of the nut projecting radially inward over the second end of the bore in the housing to axially capture the cartridge in the housing; and a retainer, carried on the cartridge for releasably latching and endform to the cartridge.

27. The fluid supply apparatus of claim 26 further comprising:

a trim plate mountable over the nut.

* * * * *